(12) United States Patent
Jo

(10) Patent No.: US 9,490,677 B2
(45) Date of Patent: Nov. 8, 2016

(54) MOTOR

(71) Applicant: LG INNOTEK CO., LTD., Seoul (KR)

(72) Inventor: Jung Woo Jo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 376 days.

(21) Appl. No.: 13/951,013

(22) Filed: Jul. 25, 2013

(65) Prior Publication Data

US 2014/0028129 A1 Jan. 30, 2014

(30) Foreign Application Priority Data

Jul. 27, 2012 (KR) .................... 10-2012-0082105

(51) Int. Cl.
*H02K 5/22* (2006.01)
*H02K 3/52* (2006.01)

(52) U.S. Cl.
CPC .............. *H02K 5/225* (2013.01); *H02K 3/522* (2013.01); *H02K 2213/03* (2013.01)

(58) Field of Classification Search
CPC ........ H02K 5/225; H02K 5/22; H02K 3/522; H02K 2213/03
USPC .................................. 310/71; 439/716, 680
See application file for complete search history.

(56) References Cited

U.S. PATENT DOCUMENTS

2001/0002776 A1* 6/2001 Suzuki et al. .................. 310/71
2008/0179975 A1 7/2008 Kataoka et al.
2009/0190060 A1* 7/2009 Choi ...................... H01R 33/02
349/58
2010/0264757 A1 10/2010 Asou et al.
2012/0286605 A1* 11/2012 Miyachi et al. ................. 310/71
2013/0069457 A1* 3/2013 Kim ....................... H02K 3/522
310/71

FOREIGN PATENT DOCUMENTS

| CN | 1622428 A | 6/2005 |
|----|-----------|--------|
| CN | 102290900 A | 12/2011 |
| EP | 0445367 A1 | 9/1991 |
| GB | 2310766 A | 9/1997 |

OTHER PUBLICATIONS

Office Action dated May 25, 2015 in Chinese Application No. 201310322461.6, filed Jul. 29, 2013.

* cited by examiner

*Primary Examiner* — Quyen Leung
*Assistant Examiner* — Noli Manaloto
(74) *Attorney, Agent, or Firm* — Saliwanchik, Lloyd & Eisenschenk

(57) ABSTRACT

A motor is provided, the motor including an insulator body coupled to a stator core wound with a plurality of coils applied with an electric power having mutually different polarities to prevent the coils and the stator core from being short-circuited, a terminal housing coupling unit integrally constituted with the insulator body, protruded to a circumferential direction and coupled to a terminal housing supplying an external electric power, a terminal housing coupled to the terminal housing coupling unit to supply an electric power to the motor, a fixing unit position-fixing the terminal housing to the terminal housing coupling unit, and a regulation unit mounted on the fixing unit to regulate a rotation angle of the terminal housing.

12 Claims, 3 Drawing Sheets

MOTOR

CROSS-REFERENCE TO RELATED APPLICATION

This application claims the benefit under 35 U.S.C. §119 of Korean Application No. 10-2012-0082105, filed Jul. 27, 2012, which is hereby incorporated by reference in its entirety.

BACKGROUND OF THE INVENTION

1. Field of the Invention

An exemplary aspect of the present disclosure relates to a motor for a vehicle.

2. Description of Related Art

In general, a BLDC (Brushless DC) motor is a motor that does away with a brush and a mechanical commutator used in a traditional motor, replacing it with an electronic device that improves the reliability and durability of the unit and generating no mechanical and electrical noise.

A conventional BLDC motor includes a stator mounted with a motor housing and a frame, a magnet rotor rotatably inserted into the stator and an axis inserted and fixed at a center of a rotor. The stator includes a stator core wound with a coil. The stator core is manufactured by punching silicon plates, each having a thickness of 1 mm or less, and stacking the silicon plates. Each silicon plate includes a cylindrical yoke unit, a plurality of tooth units, each protruded at an inner surface of the yoke unit toward a center along a circumferential direction each spaced apart at a predetermined distance, and pole units formed at a distal end of the teeth units, each having a polarity and protruded to both sides.

A plurality of slots wound with a coil is formed between the tooth units, and slot is inserted by an insulator of insulation material to insulate the stator core from the coil. The insulator is so coupled as to be inserted by being sealed from both sides along a laminated direction of the stator core.

Meanwhile, the coil may be wound to correspond to polarity of a use electric power, and may be conductively connected to mutually different terminals of three polarity in a case three (U, V, W) phase electric power is used.

The insulator is integrally provided with a terminal housing coupling unit where a terminal housing for power supply is press-fitted into the terminal housing coupling unit.

In general, in a case the terminal housing and the insulator are injection molded with a synthetic resin material, a large gap is formed between the terminal housing coupling unit and the terminal housing after assembly. In a case a large gap is formed between the terminal housing coupling unit and the terminal housing, it is disadvantageous that the terminal housing may be easily separated from the terminal housing coupling unit when an electric power applying position is assembled.

BRIEF SUMMARY

Exemplary aspects of the present disclosure are to substantially solve at least the above problems and/or disadvantages and to provide at least the advantages as mentioned below. Thus, the present disclosure is directed to provide a terminal connection structure of a structure-improved motor configured to accurately assemble a terminal housing to a power supply terminal when a motor is assembled.

In one general broad aspect of the present disclosure, there is provided a motor comprising: an insulator body coupled to a stator core wound with a plurality of coils applied with an electric power having mutually different polarities to prevent the coils and the stator core from being short-circuited; a terminal housing coupling unit integrally constituted with the insulator body, protruded to a circumferential direction and coupled to a terminal housing supplying an external electric power; a terminal housing coupled to the terminal housing coupling unit to supply an electric power to the motor; a fixing unit position-fixing the terminal housing to the terminal housing coupling unit; and a regulation unit mounted on the fixing unit to regulate a rotation angle of the terminal housing.

Preferably, but not necessarily, the fixing unit may include a side guide plate inside the terminal housing, and a hook member on the terminal housing coupling unit.

Preferably, but not necessarily, the guide plate may be protrusively arranged at both distal ends of the terminal housing.

Preferably, but not necessarily, the guide plate may include a hook portion including a through hole having an arc-shaped inner surface at a partial section, and a regulation slit extended from the through hole of the hook portion.

Preferably, but not necessarily, the hook portion may take a shape corresponding to that of the hook member and may be snap-fitted to the hook member.

Preferably, but not necessarily, the hook portion may be greater than the hook member.

Preferably, but not necessarily, the hook member may be protruded to face the side guide plate of the terminal housing coupling unit.

Preferably, but not necessarily, the hook member may include a hook protrusion, an entry unit at a distal end of one side of the hook protrusion and a regulation protrusion extended to one direction of the hook protrusion.

Preferably, but not necessarily, the hook protrusion may take an arc shape at a surface contacting the hook portion.

Preferably, but not necessarily, the regulation protrusion may be straight.

Preferably, but not necessarily, an angle between the regulation protrusion and the regulation slit may be 15°~25° based on a surface perpendicular to an insertion direction of the terminal housing.

DETAILED DESCRIPTION

Now, a motor according to an exemplary embodiment of the present disclosure will be described with reference to the accompanying drawings.

Figure 1:
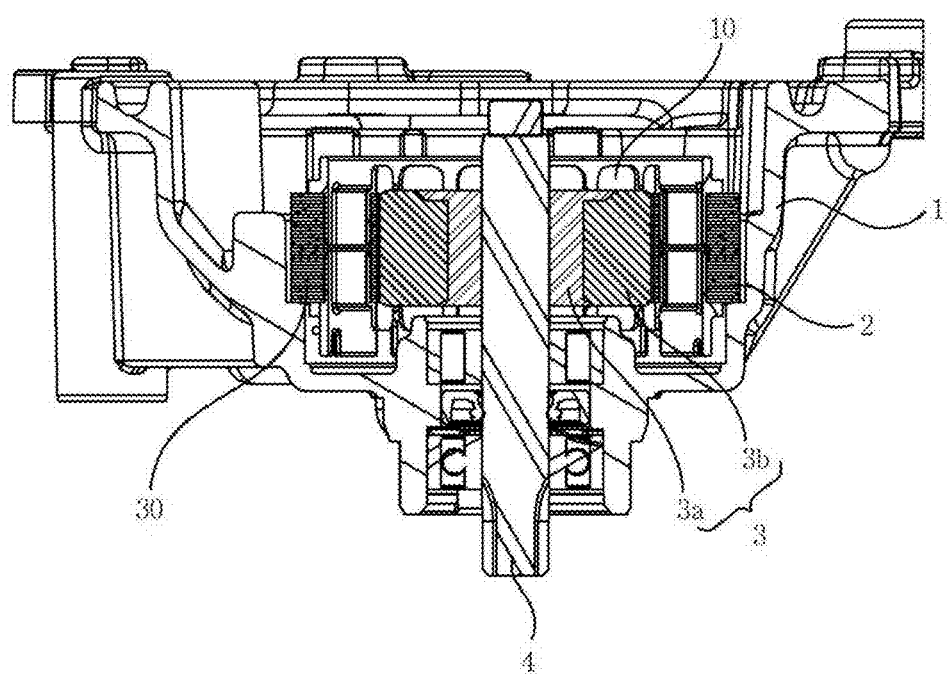
FIG. 1 is a cross-sectional view illustrating a motor according to an exemplary embodiment of the present disclosure.
Figure 2:
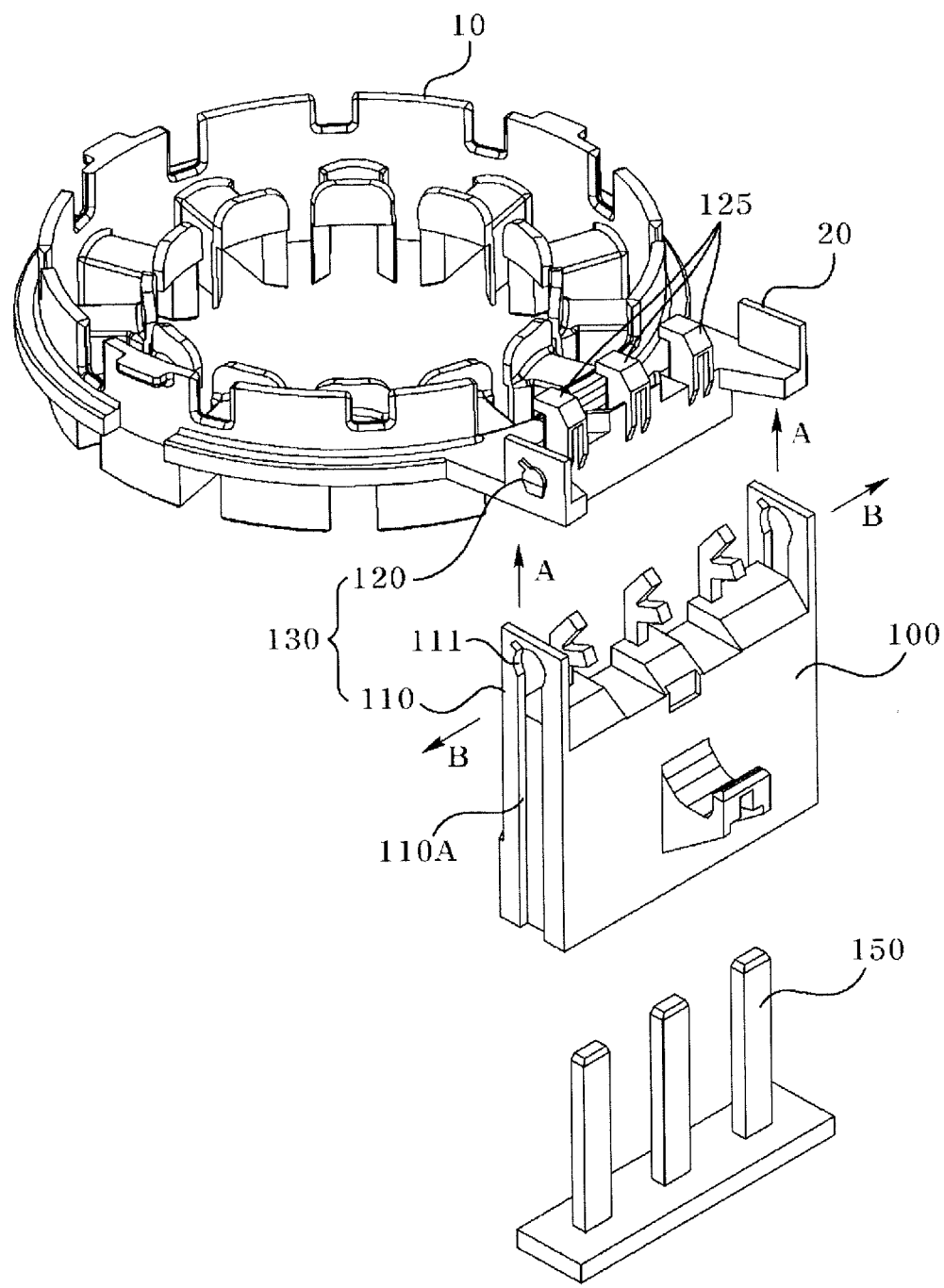
FIG. 2 is an exploded perspective view illustrating a stator of FIG. 1.
Figure 3:
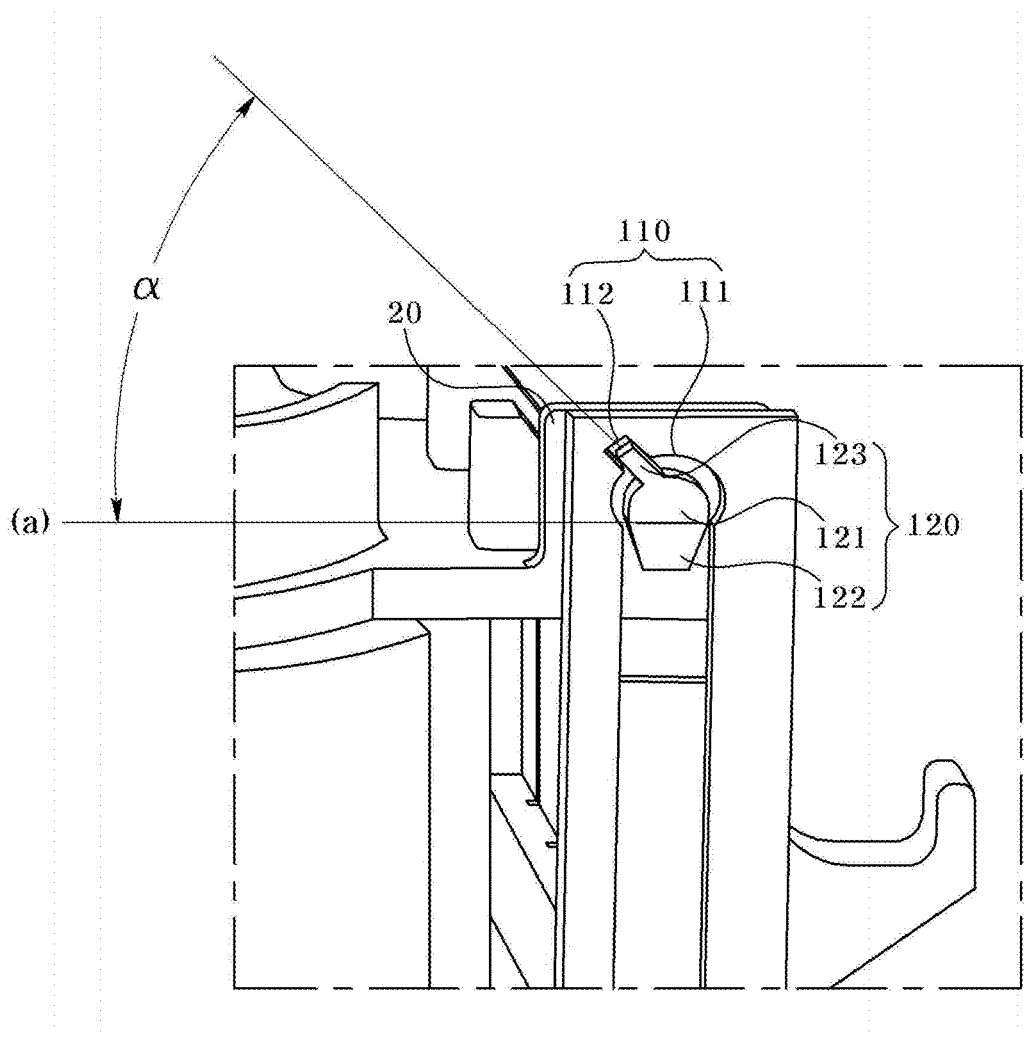
FIG. 3 is an enlarged view of an essential part of FIG. 2.

FIG. 1 is a cross-sectional view illustrating a motor according to an exemplary embodiment of the present disclosure, FIG. 2 is an exploded perspective view illustrating a stator of FIG. 1, and FIG. 3 is an enlarged view of an essential part of FIG. 2.

The motor according to an exemplary embodiment of the present disclosure includes a motor housing (1), a stator (2), a rotor (3) and a rotation shaft (4) as illustrated in FIG. 1.

The motor housing (1) may be provided in a state of an upper surface being opened, and may be fixed therein by the stator (2). The motor housing (1) may come in various shapes depending on the types of motors, and in case of a motor used for a DCT (Dual Clutch Transmission), a pair of motor housings (1) having a shape as shown in FIG. 1 may be provided. At this time, the opened upper surface of the motor housing (1) may be arranged with a power output axis connected to or released from the rotation shaft (4, described later) of the motor to selectively receive a power outputted from the rotor (3).

Unlike the conventional manual transmission vehicle, the DCT contains the traditional elements of a manual and is driven by a twin, or dual clutch module. In the DCT, the clutches operate independently. One clutch controls the odd gears (first, third, fifth and reverse), while the other controls the even gears (second, fourth and sixth). Using this arrangement, gears can be changed without interrupting the power flow from the engine to the transmission. That is, the DCT system works by using a system of twin clutches which shifts gears automatically with the direction of the driver and assistance of a computer. Without a clutch pedal, the DCT system is able to shift faster than a manual, while still allowing more control and power than an automatic transmission.

In general, the DCT includes a dual clutch, a transmission control unit setting each gear shift stage by receiving a power from the dual clutch, a clutch actuator controlling each clutch of the dual clutch, a gearshift actuator performing the gearshift by applying selecting and shifting manipulation to the transmission control unit, and an electronic control unit electronically controlling the clutch actuator and the gearshift actuator by receiving various information including a vehicle speed and shift commands. Thus, the stator (2) installed at the motor housing (1) is connected to the output axis of the rotor (3) by selection operation of the clutch actuator and the power is transmitted to each transmission.

The stator (2) is provided inside the motor housing (1), and may be preferably coupled to a cylindrical stator reception unit formed at an inner space of the motor housing (1) as illustrated in FIG. 1. The stator (2) may be formed at a stator core (30) of metal material for formation of magnetic flux with a plurality of teeth, each tooth wound with a coil, whereby an electric power may be applied to the coil to form a magnetic field. At this time, the stator core having the plurality of teeth may be wound with the coil, while being installed with an insulator thereon, to prevent an electric from flowing thereon. Meanwhile, the number of teeth may be increased or decreased depending on the size and output of the motor.

The rotor (3) may include a core member (3a) centrally coupled by the rotation shaft (4), and a magnetic member (3b) press-fitted into the core member (3a).

Referring to FIGS. 2 and 3, an approximately ring-shaped insulator body (10) may be installed at an upper surface of the stator core (30) of the stator (2). The insulator body (10) may be integrally provided in one body with a terminal housing coupling unit (20) so as to be protruded from a distal end thereof. In general, the insulator body (10) is injection molded with a resin material, such that the terminal housing coupling unit (20) is preferably injection molded with the same material as that of the insulator body (10). The terminal housing coupling unit (20) may be attachably and detachably coupled by a terminal housing (not shown) for connection with a power supply unit (not shown)

Referring to FIG. 2, the insulator body (10) may be centrally formed with a plurality of tooth guides, with each tooth guide coupled to match, one on one, the each tooth centrally formed on the stator core (30). The tooth guides function to prevent the coil wound on the teeth from being short-circuited with the stator core (30) formed with a conductive material.

In general, the insulator body (10) is injection molded with a resin material, and the terminal housing coupling unit (20) may be preferably injection molded with the same material as that of the insulator body (10). The terminal housing (100) of the terminal housing coupling unit (20) may be attachably and detachably coupled by a fixing unit (130) for connection with the power supply unit (not shown).

The fixing unit (130) includes a side guide plate (110) provided on the terminal housing (100) and a hook member (120) provided at the terminal housing coupling unit (20).

The side guide plate (110) is formed to protrude at both distal ends of the approximately cubic-shaped terminal housing (100) to an upper side direction on FIGS. 2 and 3. The side guide plate (110) may include an arc-shaped hook portion (111) at an upper end of an elongated channel (110A) at a position corresponding to that of the hook member (120), and a regulation slit (112) for regulating a rotation angle of the terminal housing (100).

The side guide plate (110) is fixed at a terminal housing coupling unit (20) side integrally formed with the terminal housing (100) at the insulator body (10), and a predetermined angle is rotatably provided when the stator (2) including the insulator body (100 is assembled on the housing (1) and a power terminal (150) is coupled to a bottom side of the terminal housing (100), whereby the assembly between the power terminal (150) and the terminal housing (100) can be improved in the course of assembly process.

The hook portion (111) may be provided in the same shape as that of the hook member (120) to allow the hook member (120) to be snap-fitted. The hook portion (111) may be formed larger than the hook member (120) so that the hook member (120) can be rotatably assembled inside the hook portion (111).

The regulation slit (112) may be formed at a position corresponding to that of a regulation protrusion (123) formed at the hook member (120), and the direction and size of the regulation slit (112) may be variably configured according to design. For example, an angle (α) of the regulation slit (112), as illustrated in FIGS. 2 and 3, may be 15°~25° based on a surface perpendicular to an insertion direction of the power terminal (150) from a center of the hook portion (111).

According to an exemplary embodiment of the present disclosure, the angle of the regulation slit (112) may be at 20° but the angle is not limited thereto, and may be variably formed according to design need.

In a case the regulation slit (112) is formed as mentioned above, although the angle of the rotating terminal housing (100) may partially move about the hook member (120) according to a gap between the hook member (120), the rotation of the terminal housing (100) can be regulated, whereby the terminal housing (100) is prevented from being broken by interference with the housing (1) in the course of being coupled to the power terminal (150) while the terminal housing (100) is inserted into the housing (1), or too tightly fixed into the housing (1).

The hook member (120) is protrusively formed to a direction facing the side guide plate (110) of the terminal housing coupling unit (20), and may include a hook protrusion (121), an entry unit (122) and a regulation protrusion (123).

The hook protrusion (121) may be provided at a rear end of the entry unit (122). The hook protrusion (121) is hooked to the hook portion (111) at a coupling position of the terminal housing (100) to prevent the terminal housing (100) from being disengaged from the terminal housing coupling unit (20).The hook protrusion (121) is hooked and coupled to the hook portion (111) formed at the side guide plate (110), where each contact surface takes an arc shape to allow a round inner surface of the hook portion (111) to rotatably slide with an external surface of the hook protrusion (121).

The entry unit (122) is provided to have a sliding slant surface having a predetermined angle relative to an insertion direction ('A' direction of an arrow in FIG. 2) of the terminal housing (100), whereby, in a case the side guide plate (110) is inserted to a position corresponding to the hook member (120), the side guide plate (110) can be elastically deformed to a direction (arrow 'B' direction) perpendicular to the insertion direction.

The regulation protrusion (123) is protrusively formed by being extended to one direction of the hook protrusion, and according to an exemplary embodiment of the present disclosure, the regulation protrusion (123) may be provided in a shape of a straight lug having a predetermined length as shown in FIGS. 2 and 3. At this time, the regulation protrusion (123) may be provided to have a predetermined angle based on a center of the hook member (120), and according to an exemplary embodiment of the present disclosure, the regulation protrusion (123) may be provided to have a 20° angle based on a center of the hook member (120). Thus, the hook protrusion (121) and the hook portion (111) are prevented from being unlimitedly rotated by the regulation protrusion (123).

A center guide plate (125) is interposed between the hook members (120) as illustrated in FIG. 2, to guide an insertion direction during insertion of the terminal housing (100), and restricts the rotation of the terminal housing (100) when the terminal housing (100) is fixed to a coupling position. In a case the center guide plate (125) is interposed between the insulator body (10) and the terminal housing (100), the rotating terminal housing (100) is prevented from being disengaged while the coil is wound on the insulator body (10) to enable a tight coupling of the terminal housing (100).

Furthermore, the center guide plate (125) is extensively formed to a direction parallel with the insertion direction of the terminal housing (100) to prevent the terminal housing (100) from being twisted during insertion of the terminal housing (100) and to allow the terminal housing (100) to be inserted to the coupling position.

As apparent from the foregoing, a pivot rotation is possible when the terminal housing (100) is coupled to the terminal housing coupling unit (20) during the stator (2) insertion process to allow the power terminal (150) of FIG. 2 to be accurately inserted into the assembly position of the terminal housing (100).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A motor with rotation prevention of a terminal housing, comprising:
    an insulator body coupled to a stator core wound with a plurality of coils applied with an electric power having mutually different polarities;
    a terminal housing coupling unit integrally formed with the insulator body, protruded in a circumferential direction; and
    a terminal housing coupled to the terminal housing coupling unit to supply an electric power to the motor;
    wherein the terminal housing coupling unit includes a hook member comprising a regulation protrusion protrusively formed at opposite ends of the terminal housing coupling unit,
    wherein the terminal housing includes a side guide plate formed at each distal end of the terminal housing,
    wherein each side guide plate is formed with an elongated channel for slidably passing the hook member and a hook portion at an upper end of the channel to be coupled with the hook member; and
    wherein the hook portion includes a through hole having an arc-shaped inner surface thereof and communicably connected to the upper end of the elongated channel, and a regulation slit slantly formed at the arc-shaped inner surface, such that the regulation protrusion is slidably inserted into the regulation slit to inhibit a rotation of the terminal housing.

2. The motor of claim 1, wherein the regulation slit extends at a predetermined angle with respect to a diameter of the through hole of the hook portion.

3. The motor of claim 2, wherein the hook portion takes a shape corresponding to that of the hook member and is snap-fitted to the hook member.

4. The motor of claim 3, wherein a size of the hook portion is greater than that of the hook member.

5. The motor of claim 2, wherein the hook member is protruded to face the side guide plate of the terminal housing.

6. The motor of claim 5, wherein the hook member further includes a hook protrusion connected to a distal end of the regulation protrusion and an entry unit at a distal end of one side of the hook protrusion and the regulation protrusion.

7. The motor of claim 6, wherein the hook protrusion takes an arc shape at a surface facing the arc-shaped inner surface of the hook portion.

8. The motor of claim 6, wherein the regulation protrusion is formed in a linear shape.

9. The motor of claim 8, wherein an angle of the regulation protrusion and the regulation slit is in a range of 15°-25° with respect to a surface perpendicular to a direction of the terminal housing insertion.

10. The motor of claim 6, wherein the entry unit has a sliding slant surface having a predetermined angle relative to an insertion direction of the side guide plate.

11. The motor of claim 10, wherein the side guide plate is configured to be elastically deformed in a direction perpendicular to the insertion direction.

12. The motor of claim 1, further comprising a center guide plate interposed between the hook member to guide insertion of the terminal housing to the insulator body.

* * * * *